Nov. 5, 1968

T. M. BYRNE 3,409,175

LIQUID DISPENSING DEVICE

Filed Nov. 10, 1966

INVENTOR.
THOMAS M. BYRNE
BY
ATTORNEY

INVENTOR.
THOMAS M. BYRNE

ATTORNEY

United States Patent Office 3,409,175
Patented Nov. 5, 1968

3,409,175
LIQUID DISPENSING DEVICE
Thomas M. Byrne, 1602 Wicklow Way,
Madison, Wis. 53711
Filed Nov. 10, 1966, Ser. No. 593,464
10 Claims. (Cl. 222—70)

This invention relates to dispensing apparatus for liquids and more particularly to apparatus for dispensing repetitively at a high rate of speed pre-selected quantities of different liquids, especially liquor, with relatively high accuracy.

Means heretofor proposed for this purpose have been considered deficient in several respects such as rapidity, reliability and accuracy with which pre-selected measured quantities of liquid may be dispensed, ease of maintenance, ease of changing the containers in which liquid to be dispensed are provided and the like.

It is therefore an object of the present invention to provide such dispensing means which may be operated with relatively great ease.

It is another object to provide such dispensing means in which the rate of fluid flow at the dispensing spout can be readily and accurately controlled.

It is another object to provide means wherein the amount of liquid dispensed with each operation of the machine is the same upon each repetitive operation of the machine to within a few drops, preferably about one drop, and thus its accuracy of metering for repeated needed amounts is equal to or less than about 1% or 2% of the amount usually dispensed.

Another object is such dispensing means which may have its various components located at locations which may vary widely in different installations without substantially affecting performance of the apparatus.

Another object is to provide such dispensing means wherein a container in which liquid to be dispensed is stored may be replaced with a full container when the first container becomes empty with a rapidity and ease, without affecting the dispensing of liquids from other containers in the apparatus.

Another object is such dispensing means in which easy accessibility is provided to all parts of the apparatus for maintenance purposes and wherein one or more components in the system may be readily replaced without affecting other components or units in the apparatus.

Another object is to provide such dispensing means wherein the amount dispensed upon each operation of the device may be substantially the same each time or, alternatively, by changing the position of the cycle control switch, the amount dispensed each time may be caused to be a pre-selected amount or a lesser amount depending upon the manner of operation of a dispensing switch operated by an operator.

Another object is such dispensing means which occupies relatively small space.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 2:
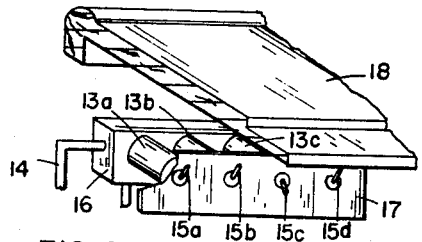
FIGURE 2 is a partially cutaway partially schematic perspective view of one portion of the apparatus of FIGURE 1.

Referring now to FIGURES 1–5, air compressor 10 compresses air and delivers it through tube 11 to tank 12 in which it is stored under pressure. The pressure at which air in tank 12 is maintained may be regulated by suitable means which in the embodiment shown is incorporated in compressor 10 but which may be provided in any suitable known manner. The pressure in tank 12 is maintained substantially constant and in the preferred embodiment described herein is maintained at any suitable high pressure such as from 60 p.s.i. to 100 p.s.i. and by suitable means such as a regulator (not shown for simplicity) which may be incorporated in the tank or provided separately. Air is caused to be delivered from the tank at about 15 pounds per square inch although suitably pressures from about 10 p.s.i. to 20 p.s.i. may be utilized in accordance with the invention. Air at such pressures is delivered from the tank through tubular means 14 to each of the manually operated two-position three-way valve 13a, 13b, 13c and 13d which may be operated with toggle levers 15a, 15b, 15d and 15c. In practice the air from tubular means 14 is introduced to a manifold 16 from which it is distributed to said valves. As shown, the valves may be associated in a single unit so that the toggle levers extend from a single panel 17. The unit in which the valves are located may be disposed below and behind a bar 18 so that the levers extend rearwardly behind the bar.

Each of valves 13a, 13b, 13c and 13d may be provided with an outlet respectively 19a, 19b, 19c and 19d and an exhaust respectively 20a, 20b, 20c and 20d.

Each of tubular means 19a, 19b, 19c and 19d may be disposed to introduce air respectively to duct means provided respectively in each of closures 21a, 21b, 21c and 21d, 21d' and 21d" provided respectively for containers 22a, 22b, 22c, 22d, 22d' 22d".

Figure 4:
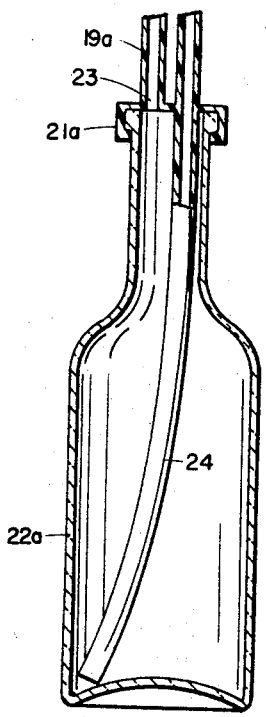
FIGURE 4 is an enlarged cross-sectional view of one of the liquid storage containers of FIGURE 1.

Referring now especially to FIGURE 4 wherein there is shown in cross-section one of the containers, namely container 22a having closure 21a, each of the closures is provided with duct means such as 23 through which air from one of the tubes such as 19a may be introduced into the interior of the container. Each closure is also provided with tubular means 24 extending toward the bottom of the bottle whence a passage communicates upwardly to the closure to communicate with tubular means such as 25a.

Although each of containers 22a to 22d" may in the future be a container of metal or other material and may be disposed with a bottom outlet or side outlet as a liquid outlet it is to be recognized that in accordance with the present invention which is particularly adapted for dispensing liquor, in view of the fact that Federal laws require that liquor be dispensed directly from an original container and not be re-packaged prior to dispensing, in accordance with the preferred embodiment of the invention, each of the containers is a glass bottle, each bottle has its neck disposed upwardly and liquid is removed through a dip tube as shown.

In order to make it unnecessary to change bottles during a period of heavy usage, one or more of the liquids to be dispensed, for which the demand is relatively great, may be provided in a plurality of containers such as containers 22d, 22d' and 22d" which may be ganged or manifolded in parallel as shown. In practice it has been found that due to other features of the device, all of the containers in such a group are generally emptied at substantially the same time. Thus when it is time to change one of the containers in such a group, when it becomes empty, each of the other containers may be changed at the same time and a changing operation for the liquid to be dispensed from these containers need be carried out only one-third as many times as usual if three containers are manifolded together as shown. However, of course, the invention is not restricted to manifolding together only three such containers but any number from two to any suitably high number may be manifolded together. Also, such manifolding of containers may be provided for one or two or more or all of the several liquids to be dispensed in any set of apparatus provided in accordance with the invention.

Each of tubular means 25a, 25b, 25c and 25d leads respectively from one of the aforesaid closures respectively to valves 26a, 26b, 26c and 26d without the interposition in said tubular means of any other valve. In other words, providing a pressure regulator, valve, check valve or restrictor in tubes 25a to 25d is found unnecessary and undesirable because adequate regulation is provided in accordance with the invention by other means as hereinbefore and hereinafter described. Each of valves 26a to 26d is a valve adapted to operate in a liquid line to interrupt flow of liquid in the line when it is closed and to allow flow of liquid in the line when it is open. Each of these valves is operated respectively by one of solenoids 27a, 27b, 27c and 27d and, when open, allows flow of liquid from lines 25a to 25d respectively to dispensing spouts 28a, 28b, 28c and 28d through tubular means 29a, 29b, 29c and 29d respectively.

Figure 5:
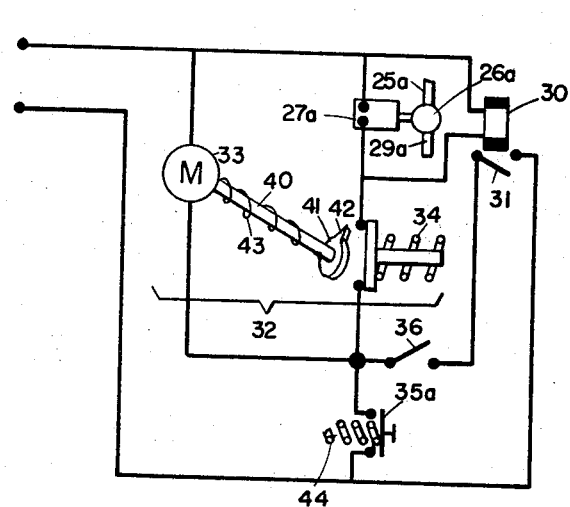
FIGURE 5 is a schematic diagram of the electrical circuit associated with each of the dispensing units of the apparatus of FIGURE 1.

Referring now to FIGURE 5 there is provided associated with each of the valves such as valve 26a, a relay comprising coil 30 and contacts 31, timer means indicated generally as 32 which may comprise motor 33 and a normally closed switch 34, normally open push-button switch 35a and cycle control switch 36 which may be a toggle switch, a sliding switch, or the like, adapted to be manually operated. Although any one of a number of different types of timers may be utilized, a suitable timer may be provided as shown with a shaft 40 driven (through a clutch, not shown for simplicity, as described below) by motor 33 having a dial 41 attached to shaft 40 and a dog pawl or cam member 42 which may be set at any suitable place on the dial 42 so that when motor 33 has caused shaft 40 to rotate to a certain extent, cam 42 strikes and opens switch 34. Spring 43 may be provided so that when current ceases to be supplied to motor 33 and it stops operation, shaft 40 is rotated by the spring back to its initial position in which it is shown in FIGURE 5. Switch 35a constitutes means to initiate operation of a liquid valve such as valve 26a. Switch 35a may be held closed by finger pressure or by pressing a container such as a glass thereagainst and may be held closed against means such as spring 44 which may be provided to bias it toward the open position. From an inspection of the figure, it may be seen that motor 33 and switch 34 are in series with switch 35a, solenoid 27a and coil 30 are in parallel with each other and are in series with switch 34 and switch 36 and contacts 31 are in a sub-circuit which is in parallel with switch 35a.

Figure 1:
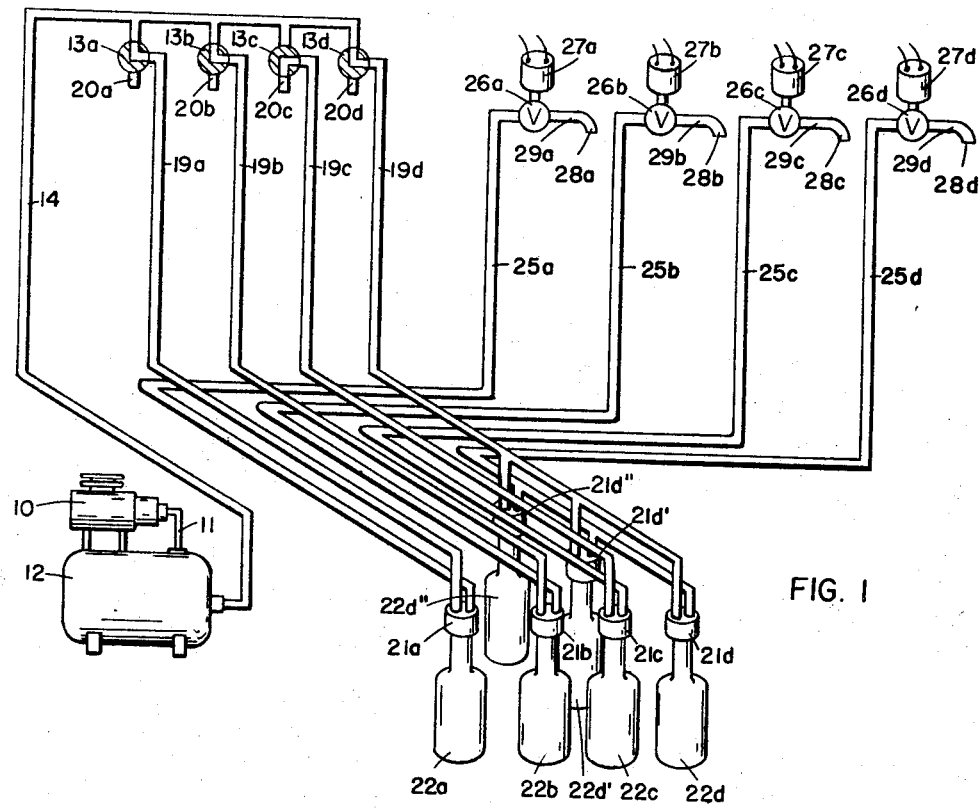
FIGURE 1 is a schematic perspective view of dispensing means in accordance with the invention.

In operation, air at a pre-selected and closely controlled pressure is introduced from tank 12 through a valve such as 13a when it is in the position shown in FIGURES 1 and 2, into a container such as container 22a so that the pressure forces liquid up to valve 26a. If switch 36 as shown in FIGURE 5 is open and switch 35a is pressed closed, solenoid 27a is energized and dispensing is started and continues as long as switch 35a is held closed or until the timer opens switch 34, whichever is shorter. In other words, the maximum amount dispensed after switch 35a is closed is the amount for which the timer is pre-set. But, if desired, a lesser amount may be dispensed by removing the pressure from switch 35a at an earlier time to allow switch 35a to open before timer switch 34 has opened. In this manner, a bartender may add a small quantity of each of a number of components in order to provide a specialty drink. If it is desired that the pre-determined amount of liquid for which the timer has been pre-set be dispensed without regard to the period during which switch 35a is held closed, switch 36 may then be closed. In this event, i.e. when switch 35a is closed, motor 33 begins operation and coil 33 pulls contacts 31 closed. Even though switch 35a is then allowed to open by removal of pressure therefrom, operation of motor 33 continues until cam 42 opens switch 34. This sequence occurs when switch 36 is closed whether or not switch 35a continues to be held closed or not and the amount dispensed is thus that for which the timer is pre-set. The timer is re-set automatically and very rapidly by operation of spring 43 upon each cessation of the operation of the motor 33. Whether switch 36 is closed or open, if switch 35a continues to be held closed after dispensing of liquid has ceased because switch 34 has been opened and the solenoid has been de-energized, the motor 33 continues to operate but does not act to further rotate shaft 40 since motor 33 drives shaft 40 through a clutch (not shown for simplicity) and the impingement of cam 42 on switch 34 acts as a stop with respect to the rotation of the shaft 40. As soon as switch 35a is opened, operation of motor 33 ceases and shaft 40 is immediately re-set to its initial position by operation of spring 43.

The rate at which fluid is dispensed from a spout such as spout 28a may be pre-selected by adjusting the pressure at which air is delivered from tank 12. Thus, for rapid operation in heavy usage situations, the air pressure may be set relatively high and the timer set relatively low to deliver a pre-selected quantity of liquid at each spout, such as for example 1 ounce, whereas if it is considered more important to avoid splashing, the pressure at which air is delivered from tank 12 may be set at a lower value and each timer may be set to operate for a longer period of time.

It has been found that the combination of providing a carefully selected, carefully maintained pressure on each of the supply containers and then providing timer operation of an output solenoid valve in the manner described provides relatively high accuracy of the amount dispensed and for dispensing of amounts from ½ ounce to 2 ounces of liquid or greater or lesser amounts at each spout for each operation of the valve associated with the spout, the amount dispensed each time varies by much less than 1% or 2%. An exception, of course, is provided when one of switches 35a to 35d is opened early, that is, before the timer associated therewith has opened a switch such as switch 34 (which of course can occur only if cycle control switch 36 is open).

To make it possible to change one of the storage containers in which liquid is contained, when the container becomes empty, with relatively great ease and speed, valves 13a to 13d are provided. Thus, if container 22c, for example, is empty, valve 13c may be placed in the position shown by operation of toggle lever 15c as shown in FIGURE 2 so that air line 19c to the bottle is connected with exhaust 20c to relieve the pressure in the bottle and the flow of air from tank 12 is interrupted. Air is thus exhausted from the bottle quietly and the bottle may be changed without a loud popping noise which occurs if this is not done and a closure may be installed on a new full bottle with relatively great ease and speed.

Figure 3:
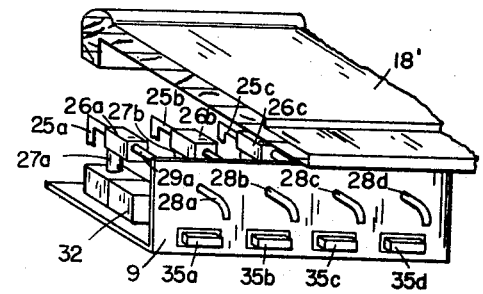
FIGURE 3 is a partially cutaway partially schematic perspective view of another portion of the apparatus of FIGURE 1.

Referring now to FIGURE 3 it may be seen that the dispensing spouts such as 28a, 28b, 28c and 28d may be provided extending rearwardly and downwardly from a single panel 9 which may be provided behind and below a bar such as bar 18' which may be the same bar or may be a different bar than bar 18. In a preferred embodiment, each of these spouts extends outwardly and downwardly from a panel and is disposed above one of the main operating switches respectively 35a, 35b, 35c and 35d with these switches being disposed to be pushed inwardly to initiate operation of the valve associated respectively with each. With this configuration, dispensing from a spout may be accomplished either by holding a glass under the spout and pushing the glass against the switch or by holding the glass in one hand and pushing the switch with a thumb or finger of the other hand. It is found in practice that operators prefer to have both modes of utilization available so that, for example, three glasses may be held in one hand and a different liquid dispensed into each by holding each glass in turn under a different spout and punching associated buttons with a finger or thumb of the other hand while in a successive instance, a glass may be held in each hand and the glasses may be held under two different spouts and respectively pressed simultaneously against the two push buttons associated with said spouts.

In less preferred embodiments, the switch may be one which may be operated by pushing a glass upwardly against the switch or may be one which extends downwardly and may be operated by pulling it toward the operator with a finger in the manner of a trigger.

Figure 6:
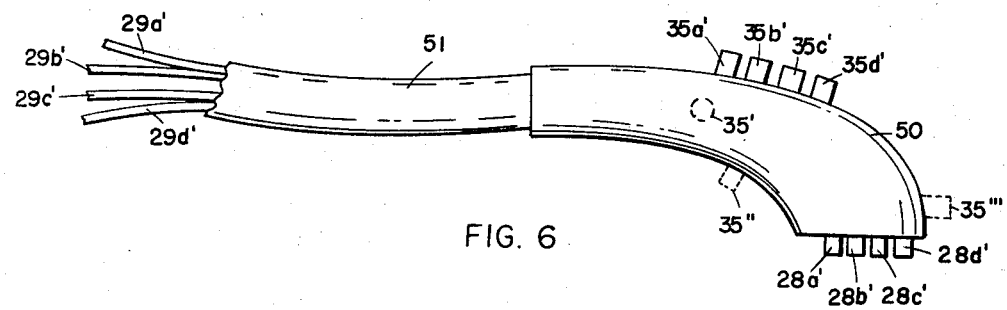
FIGURE 6 is a side elevation of a modification of a portion of the embodiment of FIGURE 1.

Instead of being associated in a single unit as shown in FIGURE 3 the spouts may be associated in a different sort of single unit as shown in FIGURE 6 wherein member 50 from which spouts 28a', 28b', 28c' and 28d' extend downwardly may be referred to as a hose head and may have hose 51 connected therewith. Contained within hose 51 and leading to the aforesaid spouts there may be provided tubes 29a', 29b', 29c' and 29d'. To initiate operation of liquid valves which may be associated with these spouts as described above with respect to valves 26a to 26d associated with spouts 28a to 28d, there may be provided push-button switches 35a', 35b', 35c' and 35d'. These switches extend outwardly from head 50 and although shown as extending upwardly they may extend sidewardly or downwardly as indicated in dotted lines at 35', 35" and 35'''. A hose head of the type shown in FIGURE 6 is adapted to be disposed behind a bar and thus the spouts in such an embodiment may be substantially behind a bar. Although the apparatus described above is adapted to dispense four different liquids, it is deemed obvious that the invention may be applied to a greater number of liquids or less number of liquids by adding or removing one or more of the units, each of which comprises a valve such as 13b, a container such as 22b, a valve such as 26b, a spout such as 28b and the above described apparatus associated therewith. Thus a single set of apparatus in accordance with the invention may be provided with means to dispense only one liquid (generally not preferred) or with means to dispense two liquids or three liquids or may be provided with means to dispense five, six, seven, eight, nine or ten liquids, the number being limited only by the normal needs of the market.

Many different spaces may be utilized to install the various portions of the device. Thus a compressor and tank may be placed under a bar or may be placed in a basement, the bottles may be under a bar, in the speedrail of a bar, on the floor or in a basement storeroom. Utilizing of a basement room which may be locked may provide relatively great security by causing all bottles used in the device to be under lock and key at all times. The air control unit of FIGURE 2 may be under a bar as shown or may be located in a basement storeroom in which the bottles are located.

The entire apparatus may be readily housed in a portable service bar which may be disposed on castors and used by catering services or in hotel meeting rooms or the like.

Use of a hose head as shown in FIGURE 6 may provide for pouring several different drinks in substantially a single synchronized rhythmic motion.

Provision of the rapidly resetting feature in the timer makes possible the repetitive operation of the device at a high rate so that the rate at which drinks may be poured successively is limited substantially only by the operator.

Line 14, lines 19a to 19d and lines 25a to 25d may be of very great length such as up to 50 feet without affecting the accuracy of the device and therefore if space is extremely limited at the point at which it is desired to pour drinks, only the unit of FIGURE 3 or that of FIGURE 6 may be installed at such place and all other parts of the apparatus may be installed at locations where space is not at such a premium. In this manner, space limitations are minimized.

To make maintenance relatively easy, the apparatus associated respectively with panel 17 in FIGURE 2 and panel 9 in FIGURE 3 may be respectively provided in drawers, with the panels being respectively drawer fronts, so that maintenance may be carried out simply by sliding these units out as drawers. By providing locks on each of these drawers, especially on that of FIGURE 3, and providing a master switch within the drawer of FIGURE 3, management is provided with means to close down or prevent operation of a unit with great ease simply by opening a drawer and operating the master switch and then locking the drawer.

It may be mentioned that a counter may be provided to count the number of drinks dispensed from each spout. The counter may be connected in parallel with solenoid 27a as shown in FIGURE 5. Each of the counters may be remote from the unit of FIGURE 3. For example, they may be provided in the basement along with the bottles in order to save space under the bar and also provide for maximum security.

The buttons of push-buttons 35a, 35b, 35c and 35d may be transparent and may be provided with lamps (not shown for simplicity). One or more lamps may be provided behind each of these buttons. Indicia may be provided on the face of each of the buttons to indicate the type of liquor which is to be dispensed from the spout associated with each button.

In a preferred embodiment, counters are provided and these are provided remote from the unit of FIGURE 3 and are connected with the unit of FIGURE 3 by wires carried in a cable which terminates in a plug which is received in a receptacle in the rear of the drawer of FIGURE 3. The main power wire is enclosed therewith also. If tampering takes place, such as jimmying of the lock on the drawer and pulling the drawer forward, the plug is pulled out thus interrupting the flow of power to the unit even if the main switch is not closed. Removal of the plug furthermore indicates that tampering has taken place if the tamperer attempts to close the drawer and leave the scene without admitting his tampering.

Figure 7:
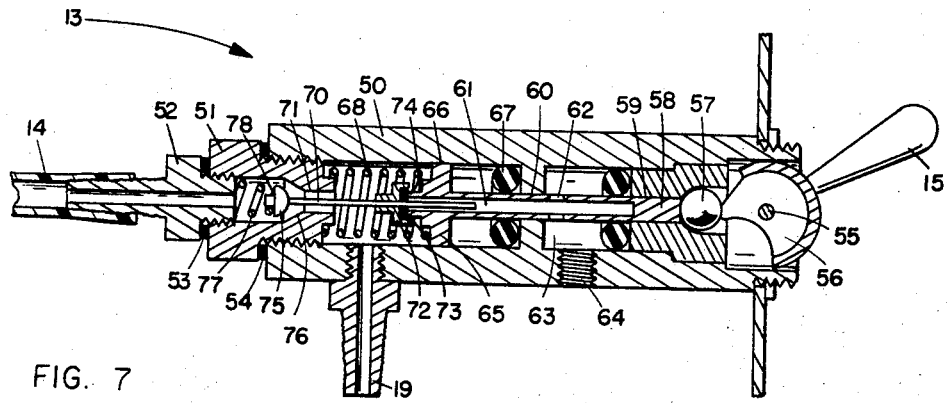
FIGURE 7 is a cross-sectional view of a three-way valve which may be utilized in the embodiment of FIGURES 1 and 2 in one position.

Referring now to FIGURE 7 there is shown a valve indicated generally as 13 which may be used to provide valves 13a to 13d in one embodiment. Air may flow into the valve from a tank such as tank 12 through tube 14 and a tube may be attached to fitting 19 to communicate with the aforementioned duct means in a bottle closure. The interior of the valve may be defined by interior surfaces of first housing 50, second housing 51 and fitting 52 to which tube 14 may be attached. Fitting 52 may be threadedly engaged in fitting 51 and housing member 51 may be threadedly engaged in housing member 50 as shown. Gaskets 53 and 54 may be provided as shown. Toggle lever 15 may be rotatably mounted on pin 55 which may be received in a portion of housing 50 and may be provided with cam portion 56 which may act against ball 57 which may bear against valve member 58 which may be slidably received in a portion of housing 50 at 59 as shown and at 60 as shown. Member 58 is provided with a longitudinal port 61 which communicates with lateral port 62 which communicates with the space 63 in housing 50 into which the exhaust port 64 leads. Member 58 is further provided with extending portion 65 which is slidably received in a cylindrical interior surface of housing 50 at 66. Portion 65 is provided with a sealing or friction member 67 on one side and receives spring 68 on the other side which biases against the face of housing portion 51 to force member 58 to the right against ball 57. A valve stem 70 of a second valve member extends through passage 71 in housing member 51 and into port 61 in member 58. On rigidly attached valve stem 70 there is provided a cup member 72 which contains a sealing ring or washer 73 which seals against a relatively sharp left edge 74 of member 58 surrounding the opening of port 61. Also rigidly attached to valve stem 70 there is provided a second sealing member having sealing surface 75 adapted to seal against surface 76 of housing 51 and receiving spring 77 on its other side at 78, spring 77 being biased against the end of fitting 52 to bias valve stem 70 and its associated sealing members to the right.

As may be seen in FIGURE 7, when toggle lever 15 is in the position shown, ball 57 is biased to the left by cam member 56 against the action of spring 68, the first sealing member 73 associated with valve stem 70 is sealed against the left end of member 58 at 74 so that in effect the passage to exhaust port 64 is closed and the leftward position of member 58 acting through valve stem 70 forces sealing surface 75 associated with valve stem 70 off its seat 76 against the action of spring 77 so that the inlet tube 14 communicates with the interior of the bottle.

Figure 8:
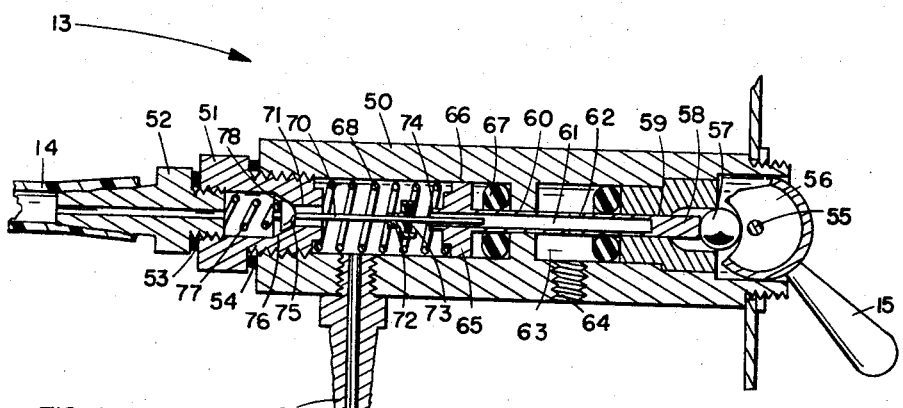
FIGURE 8 is a cross-sectional view of the three-way valve of FIGURE 7 in the other position which it occupies in normal operation.

When toggle lever 15 is in the other position as shown in FIGURE 8, ball 57 is allowed by the shape of cam member 56 to move to the right. Consequently member 58 is forced to the right by spring 68 and valve stem 70 and its associated sealing members is forced to the right by spring 77 so that sealing surface 75 is seated against surface 76 of housing 51 and flow of air from the tank is thus cut off. Spring 68 acts to force member 58 away from sealing member 73 so that edge 74 of member 58 is unseated from member 73 and the interior passage of fitting 19 is caused to communicate with exhaust 64 through ports 61 and 62 in member 58 so that pressure may be exhausted from the bottle.

Many other valves and types of valves have been found ineffective and inoperable or unsatisfactory and the valve shown in FIGURES 7 and 8 has been found preferable.

It may thus be seen that the invention is broad in scope and include such modifications as will be apparent to those skilled in the art and is to be limited only by the claims.

Having thus described my invention, I claim:

1. Dispensing means to dispense a plurality of different liquids comprising:
   a plurality of receptacles, each of which contains one of said liquids,
   each receptacle provided with duct means to introduce air to the interior of the receptacle and with first tubular means to dispense liquid from the receptacle,
   reservoir tank means to contain compressed air,
   means to compress air and deliver such compressed air to said tank means,
   a plurality of two-position three-way valves,
   each of said valves providing in one position for introduction of air to said receptacle and in the other position providing for exhausting said receptacle to atmosphere and for stoppage of introduction of air to the receptacle,
   means to deliver air from said tank to each of said valves,
   means to deliver air from each of said valves to one of said duct means,
   a regulator to regulate the pressure at which air is delivered from said tank,
   a plurality of solenoid operated liquid valves,
   second tubular means devoid of valves, floats and reservoirs, said second tubular means disposed to deliver liquid from each of said receptacles to one of said liquid valves,
   a plurality of third tubular means to supply liquid from each of said liquid valves to a dispensing spout,
   means associated with each of said liquid valves to initiate its operation,
   a timer means associated with each of said liquid valves to determine the length of time it remains open after operation of the valve is initiated,
   a relay and a cycle control swtich associated with each of said liquid valves,
   said means to initiate operation of said valve being a first normally open switch which may be held closed against means biasing it open,
   each of said timer means comprising a motor and switch contacts,
   the motor and switch contacts of said timer being in series with said first switch,
   the solenoid of said valve and the coil of said relay being in parallel with each other and in series with said timer contacts, and
   the cycle control switch being in series with the contacts of said relay in a subcircuit which is in parallel with said first switch.

2. Dispensing means to dispense a plurality of different liquids comprising:
   a plurality of receptacles, each of which contains one of said liquids,
   each receptacle provided with duct means to introduce air to the interior of the receptacle and with first tubular means to dispense liquid from the receptacle,
   reservoir tank means to contain compressed air,
   means to compress air and deliver such compressed air to said tank means,
   a plurality of two-position three-way valves,
   means to deliver air from said tank to each of said valves,
   means to deliver air from each of said valves to one of said duct means,
   a plurality of solenoid operated liquid valves,
   second tubular means devoid of valves, floats and reservoirs, said second tubular means disposed to deliver liquid from each of said receptacles to one of said liquid valves,
   a plurality of third tubular means to supply liquid from each of said liquid valves to a dispensing spout,
   means associated with each of said liquid valves to initiate its operation,
   a timer means associated with each of said liquid valves to determine the length of time it remains open after operation of the valve is initiated,
   a cycle control switch having a first position and a second position and a timer associated with each of said liquid valves,
   said means to initiate operation of said valve being a first normally open switch which may be held closed against means biasing it open,
   disposed so that when said cycle control switch is in said first position, said solenoid is operated and the valve operated by it is opened when said first switch is closed and said valve remains open for a maximum period determined by whichever is shorter of the period for which said timer is set and the period said first switch is held closed, and
   when said cycle control switch is in said second position, said solenoid is operated and the valve operated by it is opened for the period for which said timer is set without regard to the period said first switch is held closed.

3. The dispensing means of claim 1 wherein:
   each of said receptacles is a bottle,
   each of said bottles is disposed with its neck extending upwardly,
   each of said bottles is provided with a closure means, each of said closure means is provided with duct means to introduce air to the interior of the bottle and to retain said air under pressure in said interior and with tubular means extending toward the bottom of the bottle to dispense liquid upwardly from the bottle to one of said liquid valves, and at least one of said bottles is a first bottle operably connected with a second bottle of at least the same capacity as the first bottle so that the effective reservoir capacity associated with the valve fed from said first bottle is at least twice as great as the capacity of said first bottle.

4. The dispensing means of claim 3 wherein each of said dispensing spouts is substantially behind a bar.

5. The means of claim 4 wherein said spouts extend outwardly and downwardly from a panel and each is disposed above one of said means to initiate operation, each of said means to initiate operation being disposed to be pushed inwardly to initiate operation of the valve associated therewith.

6. The means of claim 4 wherein each of said spouts extends substantially downwardly from a hose-head and said spouts are disposed near to each other and each of said means to initiate operation extends outwardly from said hose-head and is spaced apart from said spouts and from each other and wherein a hose extends to said head and said plurality of tubular means to supply liquid from said liquid valves to said dispensing spouts are contained for part of their lengths within said hose.

7. The means of claim 4 wherein there is disposed substantially behind a bar a plurality of spouts in accordance with claim 8 and also a plurality of spouts in accordance with claim 9.

8. The means of claim 1 wherein said two-position three-way valves are operated by toggle levers and are associated in a single unit so that said levers extend from a single panel.

9. The means of claim 8 wherein said unit is disposed below and behind a bar so that said levers extend rearwardly behind said bar.

10. The means of claim 8 wherein said two-position three-way valves are manually tripped spring operated valves.

References Cited

UNITED STATES PATENTS

| | | | |
|---|---|---|---|
| 650,166 | 5/1900 | Chadbourn | 222—400.7 X |
| 716,321 | 12/1902 | Webster | 222—373 X |
| 2,181,224 | 11/1939 | Campbell et al. | 222—400.7 |
| 2,955,726 | 10/1960 | Feldman et al. | 222—400.7 |
| 3,036,740 | 5/1962 | Smith | 220—70 |
| 3,133,674 | 5/1964 | Schmaus | 220—70 |
| 3,305,132 | 2/1967 | Coja | 222—129.4 X |

ROBERT B. REEVES, *Primary Examiner.*

H. S. LANE, *Examiner.*

U.S. DEPARTMENT OF COMMERCE

UNITED STATES PATENT OFFICE
CERTIFICATE OF CORRECTION

Patent No. 3,409,175                                                           November 5, 1968

Thomas M. Byrne

It is certified that error appears in the above identified patent and that said Letters Patent are hereby corrected as shown below:

Column 2, line 32, "three-way valve 13a, 13b, 13c and 13d" should read -- three-way valves 13a, 13b, 13c and 13d --. Column 4, line 14, "coil 33" should read -- coil 30 --; line 40, "1 once" should read -- 1 ounce --. Column 5, line 73, "castors" should read -- casters --. Column 8, line 11, "swtich" should read -- switch --. Column 10, line 3, "claim 8" should read -- claim 5 --; line 4, "claim 9" should read -- claim 6 --.

Signed and sealed this 17th day of March 1970.

(SEAL)
Attest:

Edward M. Fletcher, Jr.                                WILLIAM E. SCHUYLER, JR.
Attesting Officer                                               Commissioner of Patents